United States Patent
Choi et al.

(10) Patent No.: US 10,186,984 B1
(45) Date of Patent: Jan. 22, 2019

(54) INVERTER CONTROL DEVICE

(71) Applicant: LSIS CO., LTD., Anyang-si, Gyeonggi-do (KR)

(72) Inventors: Seung-Cheol Choi, Anyang-si (KR); Hak-Jun Lee, Anyang-si (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 0 days.

(21) Appl. No.: 16/112,088

(22) Filed: Aug. 24, 2018

(30) Foreign Application Priority Data

Feb. 6, 2018 (KR) ........................ 10-2018-0014460

(51) Int. Cl.
| | |
|---|---|
| *H02M 7/5387* | (2007.01) |
| *H02M 7/5395* | (2006.01) |
| *H02M 7/48* | (2007.01) |
| *H02M 1/12* | (2006.01) |
| *H02P 21/22* | (2016.01) |
| *H02P 21/14* | (2016.01) |
| *H02P 21/00* | (2016.01) |
| *H02P 27/08* | (2006.01) |

(52) U.S. Cl.
CPC ............ *H02M 7/48* (2013.01); *H02M 1/12* (2013.01); *H02P 21/0003* (2013.01); *H02P 21/14* (2013.01); *H02P 21/22* (2016.02); *H02P 27/08* (2013.01)

(58) Field of Classification Search
CPC ........ H02M 7/505; H02M 7/515; H02M 7/53; H02M 7/537; H02M 7/5387; H02M 7/53875; H02M 7/53876; H02M 7/53878; H02M 7/539; H02P 27/08; H02P 21/0003
See application file for complete search history.

(56) References Cited

U.S. PATENT DOCUMENTS

| | | | | |
|---|---|---|---|---|
| 2010/0271853 | A1* | 10/2010 | Furutani | ........... H02M 7/53875 363/132 |
| 2014/0233287 | A1* | 8/2014 | Le Goualec | .............. G05F 1/10 363/98 |
| 2014/0362622 | A1* | 12/2014 | Nademi | ................ H02M 7/219 363/78 |

FOREIGN PATENT DOCUMENTS

| | | |
|---|---|---|
| KR | 1019930017286 A | 8/1993 |
| KR | 101736467 B1 | 5/2017 |

\* cited by examiner

*Primary Examiner* — Gary L Laxton
(74) *Attorney, Agent, or Firm* — K & L Gates LLP

(57) ABSTRACT

An inverter control device is disclosed. The device is configured: for determining a fundamental-wave magnitude of a phase-voltage corresponding to a modified voltage; for performing a proportional-integral (PI) operation of an error between the fundamental-wave magnitude of the phase-voltage and a magnitude of a reference voltage, and for outputting a compensation voltage; configured for adding the compensation voltage to the reference voltage to obtain an output; and for over-modulating the output and for outputting the over-modulated output as the modified voltage.

7 Claims, 8 Drawing Sheets

INVERTER CONTROL DEVICE

CROSS-REFERENCE TO RELATED APPLICATIONS

Pursuant to 35 U.S.C. § 119(a), this application claims the benefit of earlier filing date and right of priority to Korean Application No. 10-2018-0014460, filed on Feb. 6, 2018, in the Korean Intellectual Property Office, the disclosure of which is hereby incorporated by reference in its entirety.

BACKGROUND

1. Technical Field

The present disclosure related to an inverter control device.

2. Description of the Related Art

In general, an inverter is a device that electrically converts DC to AC. The inverter used in the industry receives electric power supplied from a commercial power source and varying a voltage and a frequency of the power to supply a variable voltage and frequency to the electric motor, to control a speed of the electric motor with high efficiency.

The inverter is widely used in systems requiring variable speed operation. Various configurations are realized in various application fields based on power semiconductors. The number of levels of or a magnitude of an output voltage, and voltage synthesis methods may vary based on the configuration. Various inverter configurations are realized depending on user requirements.

In industrial inverters, 3-phase half-bridge inverters are commonly used. The 3-phase half bridge inverter has a structure in which three single-phase half bridge inverters are connected in parallel, wherein each half bridge may be referred to as a pole, an arm or a leg as a basic circuit constituting the inverter.

In inverter using a constant DC stage voltage Vdc, a shift of a voltage that may be output linearly is limited based on a modulation scheme. For example, a region of a linear voltage modulation using sinuous pulse width modulation (SPWM)=$V_{dc}/2$. The region of the linear voltage modulation using a space vector PWM (SVPWM)=$V_{dc}/\sqrt{3}$. An operating region beyond the linear voltage modulation region is called an over-modulation region.

In the over-modulation region, an output voltage smaller than the reference voltage is generated. Thus, an linearity of the output voltage relate to the reference voltage is broken. As a result, the harmonics of the output voltage increase. The performance of the entire system is degraded. In some cases, operation is required in a region beyond the linear modulation region. To this end, this requires modifying a output voltage for the reference voltage using an appropriate over-modulation technique.

In the case of the conventional over-modulation technique, data to be calculated in advance in off-line is required. In addition, since a table or trigonometric function must be used for over-modulation, the inverter controller must use an excessive memory capacity. The time required for over-modulation is excessively long.

SUMMARY

The present disclosure is to provide an inverter control device which has a simplified structure, uses smaller memory capacity and thus reduces total over-modulation timing.

The purposes of the present disclosure are not limited to the above-mentioned purposes. Other purposes and advantages of the present disclosure, as not mentioned above, may be understood from the following descriptions and more clearly understood from the embodiments of the present disclosure. Further, it will be readily appreciated that the objects and advantages of the present disclosure may be realized by features and combinations thereof as disclosed in the claims.

In one aspect, the present disclosure provides an inverter control device configured for modifying a vector-based reference voltage into a vector-based modified voltage and for supplying the vector-based modified voltage to an inverter unit including a plurality of switching elements, wherein the inverter control device comprises: a determination unit configured for determining a fundamental-wave magnitude of a phase-voltage corresponding to the modified voltage; a proportional-integral (PI) control unit configured for performing a proportional-integral (PI) operation of an error between the fundamental-wave magnitude of the phase-voltage and a magnitude of the reference voltage, and for outputting a compensation voltage; a first adder configured for adding the compensation voltage to the reference voltage; and an over-modulation unit configured for over-modulating an output of the first adder and for outputting the over-modulated output as the modified voltage.

According to the present disclosure, the PI controller may be used as a closed-loop control scheme to control the fundamental-wave of the output voltage. Thus, no table is needed to define the holding angle and the magnitude of the modified voltage. Since the calculation of the trigonometric function is also not required, the configuration of the inverter control device may be simplified. Further, the control stability of the device may be secured.

Further specific effects of the present disclosure as well as the effects as described above will be described in conduction with illustrations of specific details for carrying out the invention.

DETAILED DESCRIPTION

Figure 1:
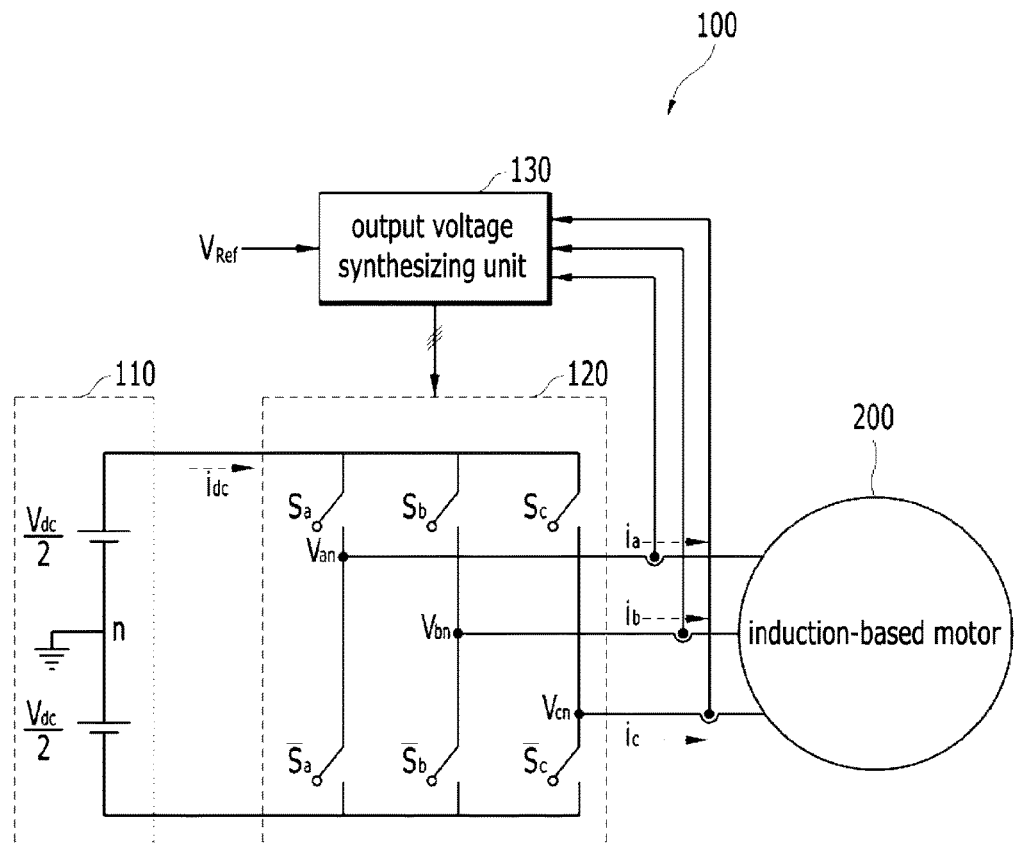
FIG. 1 is one embodiment of a typical 3-phase inverter system.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

The same reference numbers in different figures denote the same or similar elements, and as such perform similar functionality. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "connected to", or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprise", "comprising", "include", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, an inverter control device that performs conventional over-modulation will be described with reference to FIGS. 1 to 6. Referring to FIGS. 7 to 11, an inverter control device according to one embodiment of the present disclosure will be described.

FIG. 1 shows one embodiment of a typical 3-phase inverter system.

As shown in the figure, the inverter 100 includes a DC power supply 110, an inverter unit 120, and an output voltage synthesizing unit 130. The inverter may also supply power to the induction electric motor 200.

The DC power supply 110 is a DC stage power, which may include a capacitor or a battery, and may maintain a constant voltage. The inverter unit 120 includes a plurality of 3-phase switches. The 3-phase switches of the inverter unit 120 may convert a DC voltage to an AC voltage. The output voltage can also be controlled by turning on/off the 3-phase switches.

The output voltage synthesizing unit 130 outputs a pulse width modulated (PWM) gate signal and may determine the output voltage with respect to the reference voltage Vdc.

The inverter 100 receives the direct current (DC) power input Vdc of the DC power supply 110 and then outputs 3-phase alternate current (AC) output voltages $V_{an}$, $V_{bn}$, and $V_{cn}$ to the induction electric motor 200 as a 3-phase load. The 3-phase alternate current (AC) output voltage may be determined based on the on/off of the 3-phase switches of the inverter unit 120. A switch set with each phase includes two switches connected in series. Each phase operates independently of each other. Thus, the phase voltage produces an output voltage. The output voltages of three phases may be controlled to have a phase difference of 120 degrees with respect to each other.

Figure 2:
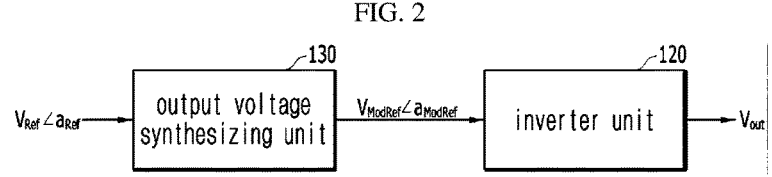
FIG. 2 shows an example of ab input-output relationship of the inverter and output voltage synthesizing unit of FIG. 1.

FIG. 2 shows an example of the input/output relationship of the inverter unit 120 and the output voltage synthesizing unit 130 of FIG. 1.

The output voltage synthesizing unit 130 may receive a reference voltage $V_{Ref}$ and modify the reference voltage vector. In the linear voltage modulation region, the reference voltage $V_{Ref}$ and the modified voltage $V_{ModRef}$ are the same, In the over-modulation region, a voltage $V_{ModRef}$ with a modified magnitude and a modified phase is output. That is, the output voltage synthesizing unit 130 may output a modified voltage $V_{ModRef}$ corresponding to the reference voltage $V_{Ref}$.

The inverter unit 120 may synthesize the output voltage $V_{out}$ via switching of a plurality of switching elements based on the modified voltage $V_{ModRef}$.

Figure 3:
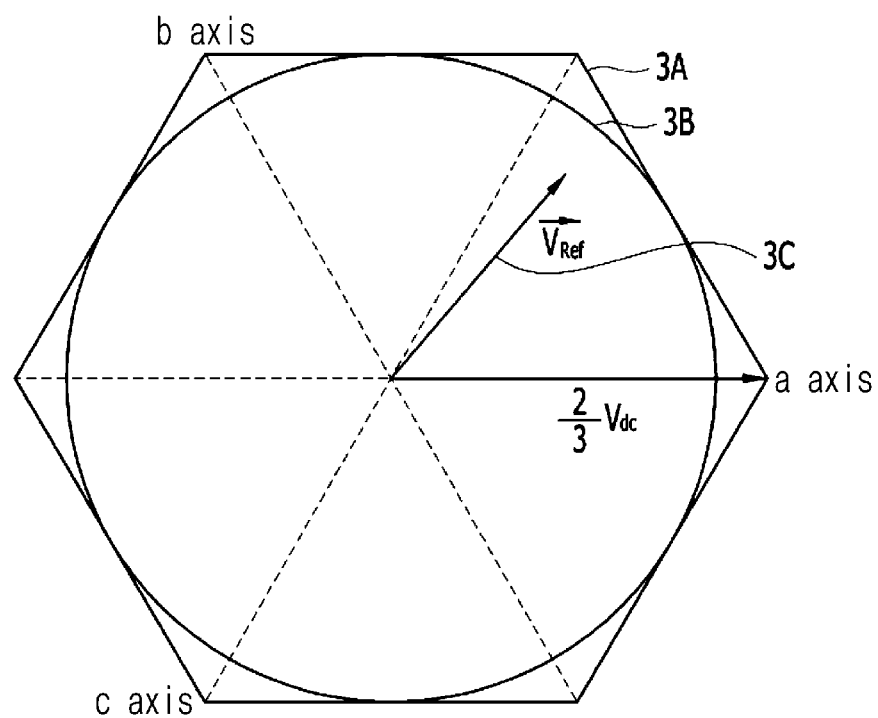
FIG. 3 shows an example of a linear voltage modulation region and an output voltage limiting line.

FIG. 3 shows an example of a linear voltage modulation region and an output voltage limiting line. 3A indicates an output voltage limiting line, while 3B represents a linear voltage modulation region.

The output voltage limiting line 3A represents a region of the voltage that a 3-phase inverter can output. The linear voltage modulation region 3B represents a voltage region in which the same output voltage as the reference voltage may be synthesized regardless of the phase of the reference voltage vector.

The output voltage limiting line 3A of FIG. 3 corresponds to that for the 3-phase half-bridge inverter of FIG. 1. The magnitude and shape of the limiting line may vary based on the topology. The magnitude of the output voltage limiting line 3A is determined by the DC stage voltage $V_{dc}$. The maximum output voltage thereof is $\frac{2}{3}V_{dc}$.

In FIG. 3, the reference voltage 3C is located inside the linear voltage modulation region 3B, so that the reference voltage and the modified voltage are the same. The inverter 100 may synthesize an output voltage corresponding to the reference voltage. That is, no over-modulation is required for the corresponding reference voltage inside the linear voltage modulation region 3B.

Figure 4:
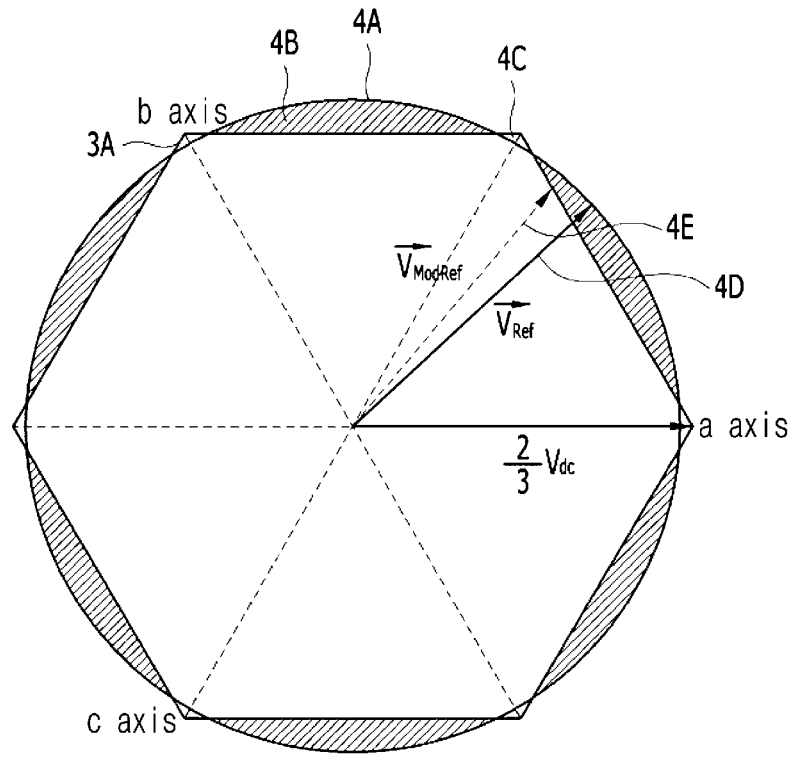
FIG. 4 shows an example for over-modulation.

FIG. 4 shows an example of over-modulation. 4A represents the movement path of the reference voltage for one cycle. 4B is a region corresponding to an error between the reference voltage and the output voltage due to an over-modulation phenomenon. 4C is an output voltage region that a voltage greater than the reference voltage may be synthesized.

Referring to FIG. 4, the reference voltage 4D is located outside the linear voltage modulation region 3B as illustrated in FIG. 3. Thus, to synthesize the output voltage corresponding to the reference voltage may be inhibited. The voltage magnitude for the corresponding reference voltage is reduced to the output voltage limiting line 3A. That is, the output voltage synthesizing unit 130 may modify the reference voltage into the modified voltage 4E so that the average of the reference voltages for one period is equal to the average of the output voltage. The output voltage synthesizing unit 130 may synthesize the output voltage from the modified voltage 4E.

In other words, the voltage in the region 4C replenishes an insufficient output voltage in the region 4B. In this way, averages for a single period between the reference voltage 4D and the output voltage may be kept the same. Thus, a linear region in which the reference voltage and the output voltage are different instantaneously but are the same on the average may be increased. In the over-modulation region, the magnitude and phase of the modified voltage may be determined via an over-modulation technique based on the magnitude of the reference voltage.

FIG. 5 and FIGS. 6A to 6E are graphs illustrating changes in the magnitude and phase of the modified voltage based on the magnitude of the reference voltage.

Figure 5:
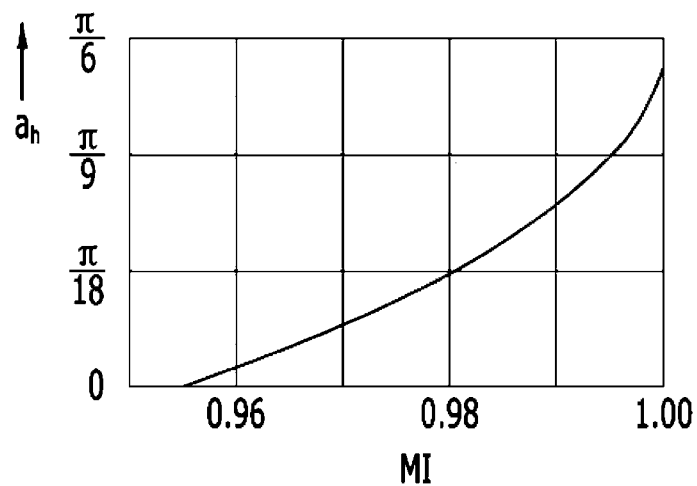
FIG. 5 and FIGS. 6A to 6E are graphs illustrating variations in the magnitude and phase of a modified voltage according to a magnitude of a reference voltage.
Figure 6:
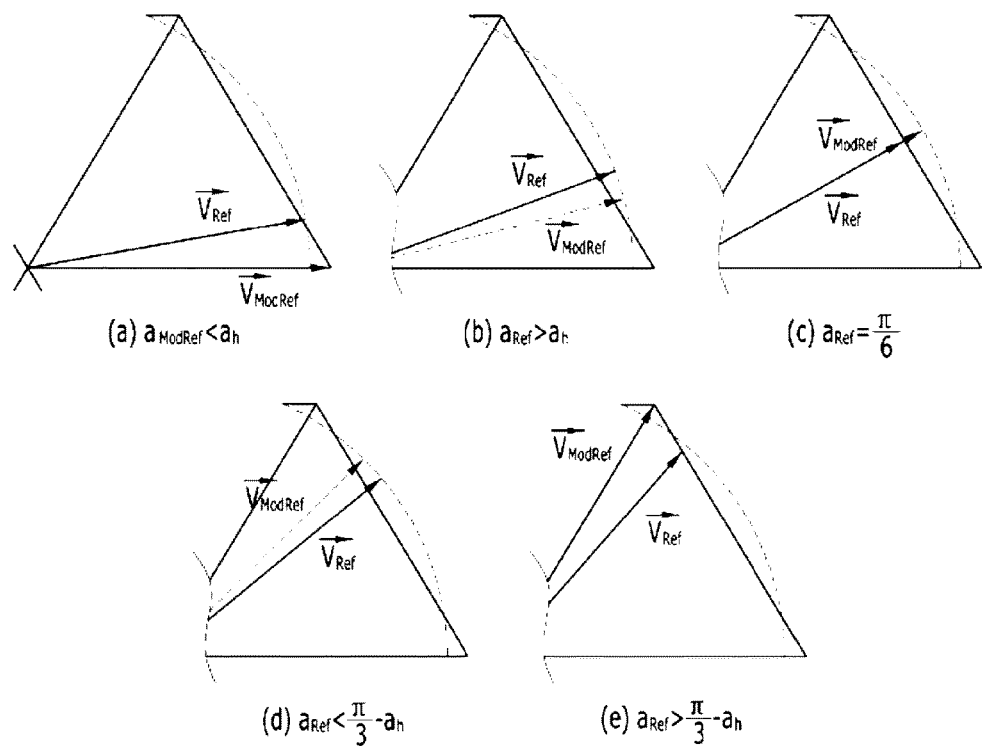

In FIG. 5, the modulation index (MI) is the ratio of the magnitude of the inverter maximum output voltage and the magnitude of the reference voltage. In the 3-phase half bridge inverters, the maximum fundamental wave magnitude of the output voltage is $2V_{dc}/\pi$.

FIG. 5 shows a holding angle $\alpha_h$ based on the magnitude and the phase angle $\alpha_{Ref}$ of the reference voltage. A following equation 1 shows the phase angle $\alpha_{ModRef}$ of the modified voltage based on the holding angle.

$$\alpha_{ModRef} = \begin{cases} 0 & 0 \leq \alpha_{Ref} \leq \alpha_h \\ \dfrac{\alpha_{Ref} - \alpha_h}{\dfrac{\pi}{6} - \alpha_h} \cdot \dfrac{\pi}{6} & \alpha_h < \alpha_{Ref} < \dfrac{\pi}{3} - \alpha_h \\ \dfrac{\pi}{3} & \dfrac{\pi}{3} - \alpha_h < \alpha_{Ref} < \dfrac{\pi}{3} \end{cases} \quad \text{[Equation 1]}$$

In this connection, $\alpha_{ModRef}$ is the phase angle of the modified voltage;
$\alpha_{Ref}$ is the phase angle of the reference voltage;
$\alpha_h$ is the holding angle.

When the phase angle of the reference voltage is smaller than the phase angle of the holding angle, the phase of the output voltage may be fixed.

FIG. 5 shows the change in the holding angle based on the MI. The phase change based on the MI may be represented using a table or a trigonometric function. When using the table, memory usage increases. When the trigonometric function is used, the execution timing is increased. Further, the holding angle in FIG. 5 is the value for one sector. In this regard, each sector should be identified and used appropriately. As may be seen from Equation 1, the modified voltage maintains a constant phase angle of 0 or $\pi/3$ near the vertex.

FIGS. 6A to 6E illustrate a change in magnitude and phase of the modified voltage based on the holding angle of FIG. 5. FIGS. 6A to 6E show the voltage region in the vicinity of the a-axis in FIG. 4.

FIG. 6A: in the operation region where the phase of the reference voltage is smaller than the holding angle, the reference voltage is adjusted to a voltage corresponding to the vertex of the hexagon of the output voltage limiting line 3A;

FIGS. 6B to 6E: when the phase of the reference voltage increases significantly above the holding angle, the reference voltage may be adjusted along the side of the hexagon of the output voltage limiting line 3A. The voltage magnitude is limited by the hexagon of the output voltage limiting line 3A, while the phase is determined by $\alpha_{ModRef}$ in the above Equation 1.

As shown in FIGS. 6A to 6E, the magnitudes and phases of the reference and modified voltages are different. The operation in the operation region above $\pi/6$ angle and the operation in the operation region below $\pi/6$ angle may be symmetrical with respect to $\pi/6$ angle.

In the conventional over-modulation technique as described above, data should be calculated in off-line in advance, using the table may allow the memory of the control device to be used, or alternatively, use of the trigonometric function may allow the execution time to increase.

An inverter control device according to one embodiment of the present disclosure may use a proportional-integral (PI) controller with a closed-loop control scheme, thereby, to simplify the structure thereof and to reduce execution time without requiring memory.

Figure 7:
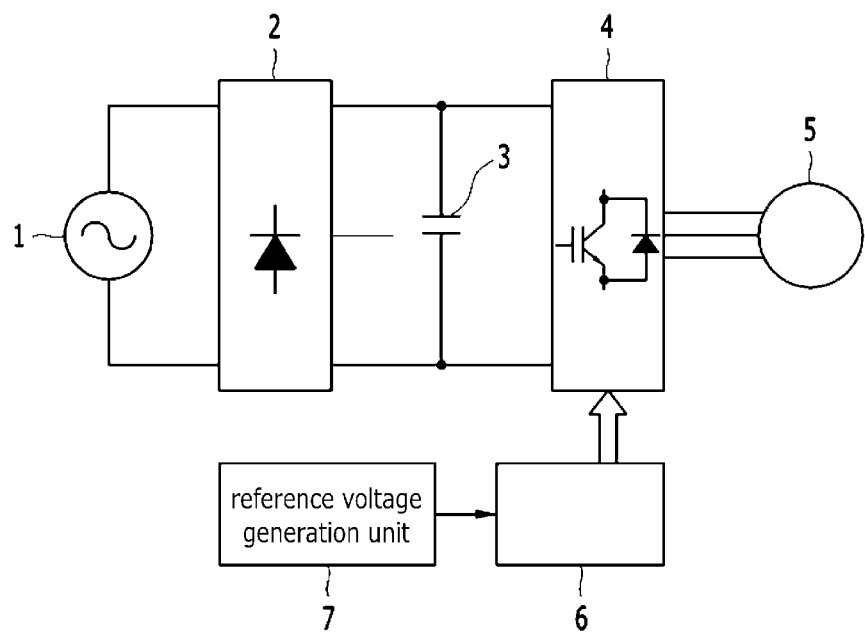
FIG. 7 is a configuration diagram of an inverter system including an inverter control device according to one embodiment of the present disclosure.
Figure 8:
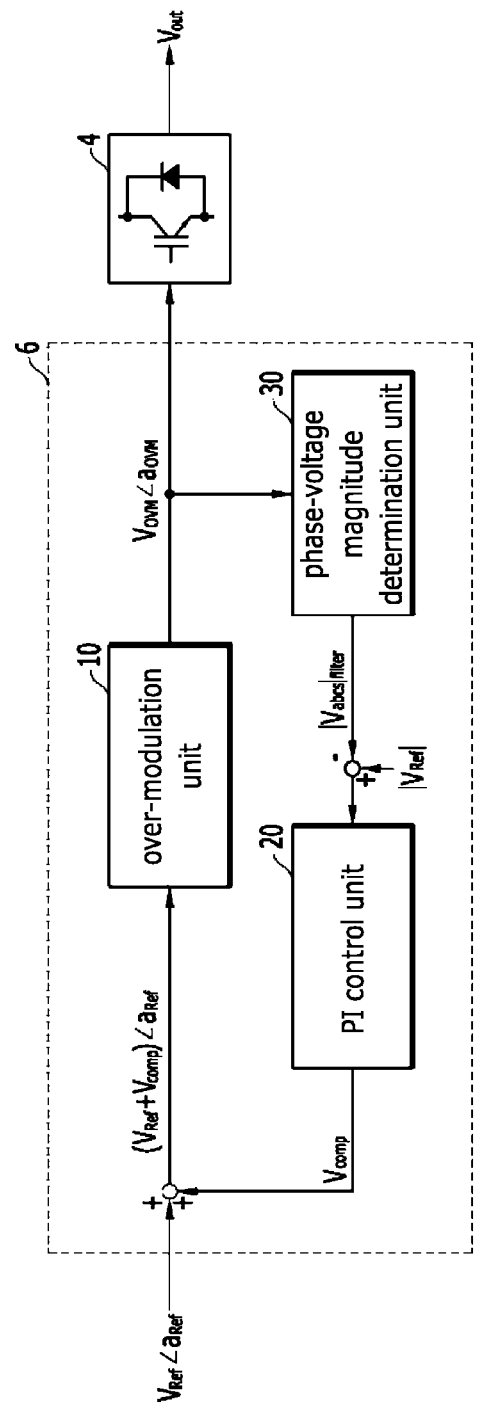
FIG. 8 shows a configuration of the inverter control device according to one embodiment of the present disclosure.

FIG. 7 shows an overall configuration of an inverter system including an inverter control device according to one embodiment of the present disclosure. FIG. 8 shows the configuration of an inverter control device according to one embodiment of the present disclosure.

Referring to FIG. 7, an inverter system according to one embodiment of the present disclosure may include a rectifier 2 for receiving a power from an alternate current (AC) power supply 1 such as a commercial power supply, and for rectifying the received power; a smoothing unit 3 for smoothing the output voltage from the rectifier 2; an inverter 4 for converting the smoothed voltage from the smoothing unit 3 to an alternate current (AC) voltage with a target frequency and voltage; and an inverter control device 6 in accordance with one embodiment of the present disclosure, wherein the device 6 may deliver information for driving the electric motor 5 to the inverter 4.

The inverter control device 6 according to one embodiment of the present disclosure receives the reference voltage generated by the reference voltage generation unit 7. The inverter control device 6 may include an over-modulation unit 10, a proportional-integral (PI) control unit 20, a phase-voltage magnitude determination unit 30, and an adder 40.

The reference voltage generation unit 7 receives an output voltage of the inverter control device 6 as feedback and modifies a reference voltage applied from an upper-level control device (not shown) based on the feedback, thereby generating a reference voltage toward the control device 6. In addition, the reference voltage may be directly applied to the control device 6 from an upper level control device (not shown). This latter configuration is irrelevant to the example of one embodiment of the present disclosure, and a detailed illustration thereof will be omitted.

The reference voltage as output from the reference voltage generation unit 7 to the control device 6 has a vector format. As shown in FIG. 8, the magnitude of the reference voltage is $V_{Ref}$, while the phase of the reference voltage is $\alpha_{Ref}$.

The control device 6 according to the present disclosure adjusts the magnitude $V_{Ref}$ and phase $\alpha_{Ref}$ of the reference voltage in the over-modulation operation region via an over-modulation scheme while maintaining the switching state. This produces and outputs a modified voltage with a vector format. The latter (that is, modified voltage) magnitude is $V_{OVM}$, and the latter phase is $\alpha_{OVM}$. In this way, the modified voltage may be provided to the inverter 4 so that the inverter 4 synthesizes the output voltage.

The phase-voltage magnitude determination unit 30 may calculate the fundamental-wave magnitude of the phase-voltage corresponding to the modified voltage. Detailed examples thereof will be exemplified below.

The proportional-integral (PI) control unit 20 receives an error between the magnitude of the fundamental-wave magnitude of the modified voltage determined by the phase-voltage magnitude determination unit 30 and the magnitude of the reference voltage. The control unit 20 performs a proportional-integral (PI) operation of the error, thereby outputting a compensation voltage $V_{comp}$. In general, the PI control unit integrates the error signals between the reference input and the output result and outputs a proportional-integral (PI) controlled value for the errors. The detailed configuration of the PI control unit 20 is already well known, and a detailed description thereof will be omitted.

The adder 40 may add the compensation voltage $V_{comp}$ to the reference voltage to generate a sum and input the sum to the over-modulation unit 10. That is, the adder 40 may increase the magnitude of the input voltage of the over-modulation unit 10 to match the magnitude of the reference voltage with the magnitude of the fundamental-wave of the modified voltage. In this connection, the reference voltage has a vector format, so the compensation voltage in the scalar form may be added to the magnitude $V_{Ref}$ of the reference voltage, while the phase $\alpha_{Ref}$ of the reference voltage may be output without change.

The over-modulation unit 10 may modify the reference vector so as to maximize the switching state and output the modified vector. However, when the reference voltage is located outside the linear voltage modulation region 3B as shown in FIG. 3 and the synthesis of the output voltage corresponding to the reference voltage is impossible, the over-modulation unit 10 outputs the modified vector by over-modulating the reference voltage. When the reference voltage is located inside the linear voltage modulation region 3B illustrated in FIG. 3, the operation of the over-modulation unit 10 may not be performed, but the reference vector may be output to inverter 4. This has been as described above.

Figure 9:
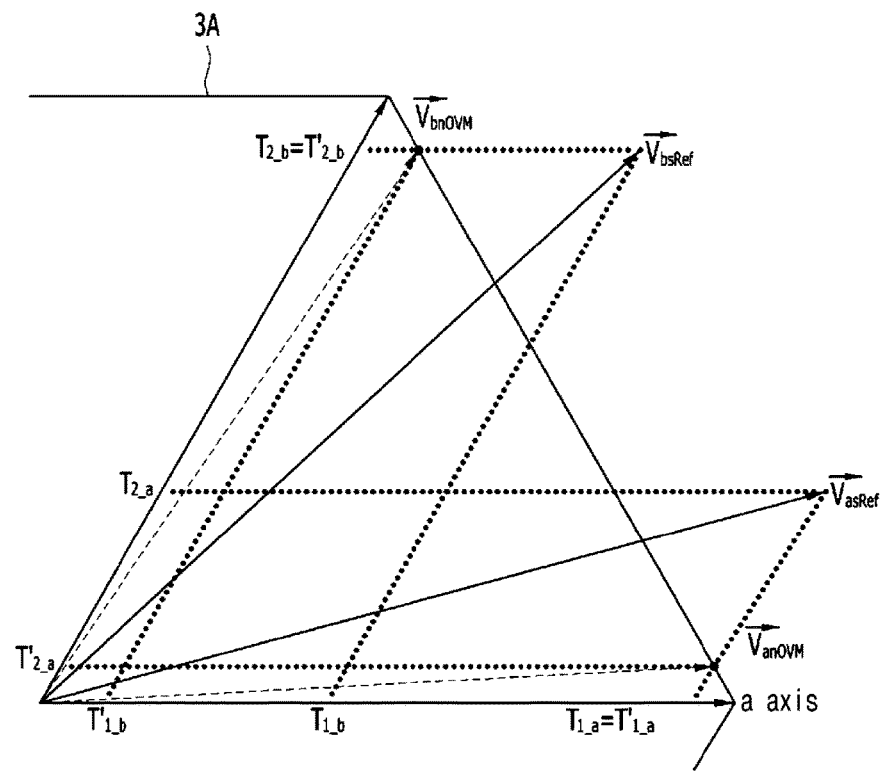
FIG. 9 is an example to illustrate change in a voltage vector due to over-modulation by over-modulation unit.

FIG. 9 is an example for illustrating the change of the voltage vector due to the over-modulation of the over-modulation unit 10. In the example of FIG. 9, the reference voltage vector is labeled $V_{asRef}$ and $V_{bsRef}$. This is for the simplicity of the drawing notation. As described above, the compensation voltage vector as output from the PI control unit 20 will be added to the reference voltage vector.

The over-modulation unit 10 may modify the reference voltage vector so as to maintain the switching state of the switching elements of the inverter 4 as much as possible. As shown in the figure, when the reference voltage vector is located like $V_{asRef}$, $V_{asRef}$ may be modified to $V_{anOVM}$ to enable the reference voltage vector.

In this connection, valid vector application times for $V_{asRef}$ vector are $T_{1\_a}$ and $T_{2\_a}$. However, the sum of $T_{1\_a}$ and $T_{2\_a}$ is larger than a single switching period $T_{samp}$. Thus, valid vector application times for $V_{asRef}$ vector must be modified.

In one embodiment of the present disclosure, the over-modulation unit 10 modifies the smaller of $T_{1\_a}$ and $T_{2\_a}$ while unchanges the larger of $T_{1\_a}$ and $T_{2\_a}$, such that the modified voltage vector is located on the output voltage limiting line 3A. Therefore, $T_{1\_a}$ may remain unchanged, while $T_{2\_a}$ may be reduced to $T'_{2\_a}$. This principle applies equally to the case of the reference voltage vector $V_{bsRef}$. That is, the valid vector application time for the modified voltage vector may be expressed by a following equation 2:

$$\text{if } T_1 > T_2 \Rightarrow \begin{cases} T'_1 = T_1 \\ T'_2 = T_{samp} - T_1 \end{cases} \quad \text{[equation 2]}$$

$$\text{if } T_1 < T_2 \Rightarrow \begin{cases} T'_1 = T_{samp} - T_2 \\ T'_2 = T_2 \end{cases}$$

As described above, in the method of determining the modified voltage vector by limiting the valid vector application time for the reference voltage vector, the larger the reference voltage vector, the modified voltage vector may be determined to be the vertex of the output voltage limiting line 3A. Therefore, this may be switched to a six-step mode (a mode in which the output voltage vector outputs only the vertex of the output voltage limiting line 3A). In this six-step mode, the fundamental-wave component of the output voltage of the inverter may be used as full as possible.

One example in which the over-modulation unit 10 according to one embodiment of the present disclosure limits the valid vector application time has been proposed as an example of a scheme for outputting the modified voltage vector. The present disclosure is not limited thereto.

Figure 10:
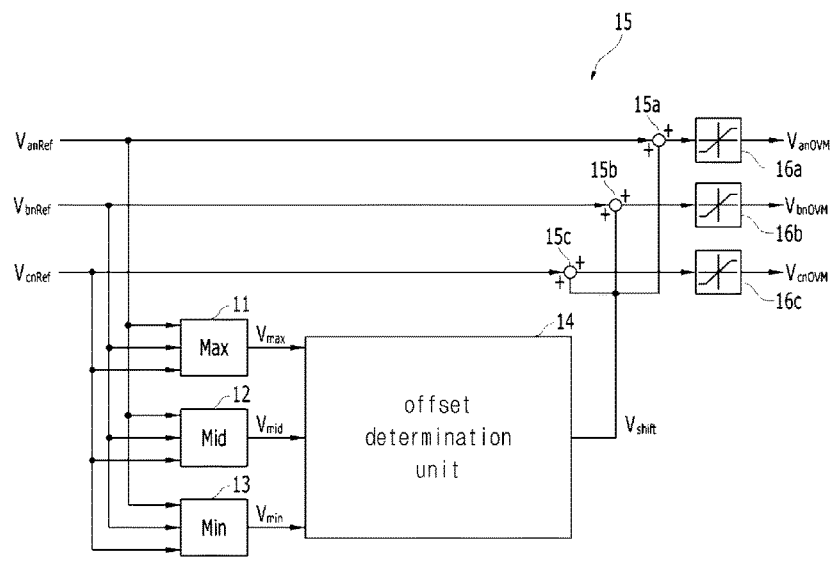
FIG. 10 is a configuration diagram to illustrate another embodiment of the over-modulation unit of FIG. 8.

FIG. 10 is a configuration diagram to illustrate another embodiment of the over-modulation unit of FIG. 8.

As shown in the figure, the over-modulation unit 10 according to another embodiment of the present disclosure may include a maximum-value determination unit 11, a middle-value determination unit 12, a minimum-value determination unit 13, an offset determination unit 14, an adder 15a, 15b and 15c, and a limiting unit 16a, 16b, and 16c. However, in the example of FIG. 10, the input is also indicated as the reference voltage, but this is only for the simplicity of the drawing notation. Specifically, the compensation voltage as output from the PI control unit 20 may be added to the reference voltage vector. This has already been described.

The maximum-value determination unit 11 determines a maximum-value of a magnitude among the 3-phase reference voltages. The middle-value determination unit 12 determines a middle-value of a magnitude among the 3-phase reference voltages. The minimum-value determination unit 13 determines a minimum-magnitude among the 3-phase reference voltages. The offset determination unit 14 may determine an offset using a following equation via the maximum-value, middle-value, and minimum-value:

$$\text{if}(V_{max} - V_{min} > V_{mid} - V_{min}), V_{shift} = \frac{V_{dc}}{2} - V_{max} \quad \text{[Equation 3]}$$

-continued $$\text{if}(V_{max} - V_{min} \le V_{mid} - V_{min}), V_{shift} = -\frac{V_{dc}}{2} - V_{min}$$

In this connection, Vmax refers to the maximum-value, Vmid to the middle-value, Vmin to the minimum-value;

Vdc refers to a DC stage voltage of the smoothing unit 3;

Vshift refers to the offset.

The determined offset may be added, via the adder 15a, 15b and 15c, to the reference voltage having each phase, and, hence, a sum is generated. If the limiting unit 16a, 16b, and 16c limits the sum to a predetermined range, the modified voltage may be output.

In one embodiment of the present disclosure, the phase-voltage magnitude determination unit 30 converts the output of the over-modulation unit 10 to the phase-voltage, and then determines the magnitude of the phase-voltage and then may provide the same to the PI control unit 20.

Figure 11:
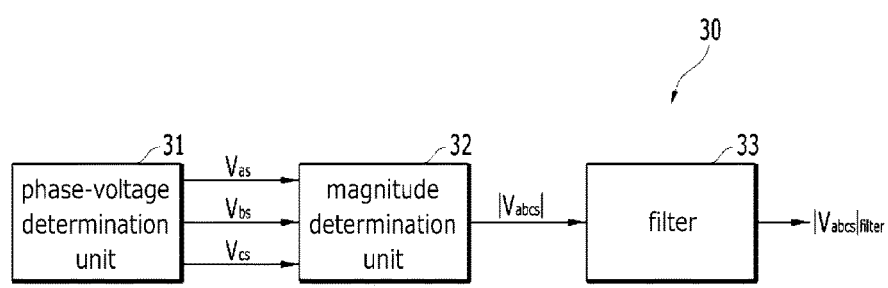
FIG. 11 shows a detailed configuration of a phase-voltage magnitude determination unit.

FIG. 11 shows the detailed configuration of the phase-voltage magnitude determination unit 30 of FIG. 8.

As shown in the figure, the phase-voltage magnitude determination unit 30 in accordance with one embodiment of the present disclosure may include a phase-voltage determination unit 31, a magnitude determination unit 32, and a filter 33. Since the output of the over-modulation unit 10 is a polar voltage, the phase-voltage determination unit 31 may convert the polar voltage to the phase-voltage.

In general, the relationship between the phase-voltage of the electric motor and the polar voltage of the inverter is as follows.

$$v_{an} = v_{as} + v_{sn}$$

$$v_{bn} = v_{bs} + v_{sn}$$

$$v_{cn} = v_{cs} + v_{sn} \quad \text{[equation 4]}$$

In this connection, $v_{as}$, $v_{bs}$, and $v_{cs}$ indicate respectively phase-voltages of a 3-phase load (for example, an electric motor 5); $v_{an}$, $v_{bn}$, and $v_{cn}$ indicate respectively polar-voltages of the inverter. The latter corresponds to an input in FIG. 11, $v_{sn}$ refers to the offset voltage. The offset voltage may indicate a difference between a neutral point voltage of the inverter and a neutral point voltage of the 3-phase load. That is, from the Equation 4, the polar voltage may be the sum of the phase-voltage and the offset voltage. Even when a sine wave at 3-phases equilibrium is used as the phase-voltage, the polar voltage may vary based on the offset voltage.

From the above Equation 4, the offset voltage may be obtained as a following Equation 5. The phase-voltage may be expressed by a following Equation 6

$$v_{sn} = \frac{v_{an} + v_{bn} + v_{cn}}{3} \quad \text{[equation 5]}$$

$$v_{an} = v_{as} - v_{sn}$$

$$v_{bn} = v_{bs} - v_{sn}$$

$$v_{cn} = v_{cs} - v_{sn} \quad \text{[equation 6]}$$

Therefore, the phase-voltage determination unit 31 in accordance with the present disclosure may calculate the output phase-voltage vector from the modified voltage vector using the Equation 5 and Equation 6 above.

The magnitude determination unit 32 may determine the magnitude of the phase-voltage from the output phase-voltage vector. However, since the calculated phase-voltage contains harmonic components, the exact fundamental-wave component may not be known. In particular, an influence of the sixth harmonic component is large.

Accordingly, the filter 33 may remove the harmonic component from the output of the magnitude determination unit 32. The filter 33 may be embodied as a band stop filter or alternatively as a low pass filter. When the filter 33 is a band-stop filter, a center frequency may correspond to the sixth harmonic of the phase-voltage. When the filter 33 is a low-pass filter, a cut-off frequency may correspond to a frequency lower than the sixth harmonic.

In this way, the harmonic component is removed. Especially, the harmonic component in the over-modulation region may be removed from the input of the PI control unit 20, so that the fundamental-wave component of the modified voltage may be reliably controlled.

According to the present disclosure, the PI controller is used as a closed-loop control scheme to control the fundamental-wave of the output voltage. Thus, no table is needed to define the holding angle and the magnitude of the modified voltage. Since the calculation of the trigonometric function is also not required, the configuration of the inverter control device may be simplified. Further, the control stability of the device may be secured.

In the above description, numerous specific details are set forth in order to provide a thorough understanding of the present disclosure. The present disclosure may be practiced without some or all of these specific details. Examples of various embodiments have been illustrated and described above. It will be understood that the description herein is not intended to limit the claims to the specific embodiments described. On the contrary, it is intended to cover alternatives, modifications, and equivalents as may be included within the spirit and scope of the present disclosure as defined by the appended claims.

What is claimed is:

1. An inverter control device configured for modifying a vector-based reference voltage into a vector-based modified voltage and for supplying the vector-based modified voltage to an inverter unit including a plurality of switching elements, wherein the inverter control device comprises:
    a determination unit configured for determining a fundamental-wave magnitude of a phase-voltage corresponding to the modified voltage;
    a proportional-integral control unit configured for performing a proportional-integral operation of an error between the fundamental-wave magnitude of the phase-voltage and a magnitude of the reference voltage, and for outputting a compensation voltage;
    a first adder configured for adding the compensation voltage to the reference voltage; and
    an over-modulation unit configured for over-modulating an output of the first adder and for outputting the over-modulated output as the modified voltage.

2. The inverter control device of claim 1, wherein the determination unit includes:
    a phase-voltage determination unit for determining each phase-voltage of a vector-based 3-phases voltage from the modified voltage;
    a magnitude determination unit for determining a magnitude of each phase-voltage; and
    a filter for removing a harmonic component from the magnitude of the phase-voltage and for outputting the phase-voltage having a fundamental-wave magnitude.

3. The inverter control device of claim 2, wherein the filter includes a band-stop filter, wherein a center frequency of the band-stop filter is a sixth harmonic of the phase-voltage vector.

4. The inverter control device of claim 2, wherein the filter includes a low-pass filter, wherein a cut-off frequency of the low-pass filter is selected as a frequency lower than a sixth harmonic of the phase-voltage vector.

5. The inverter control device of claim 1, wherein the over-modulation unit is configured to maintain a larger one of both valid vector application times for vector-based input while to modify a smaller one of the both valid vector application times according to a sampling period, such that the modified voltage is positioned on an output voltage limiting line.

6. The inverter control device of claim 1, wherein the over-modulation unit includes:
　a maximum-value determination unit for determining a maximum-value of a magnitude among three-phases voltages of the 3-phase reference voltage;
　a middle-value determination unit for determining a middle-value of a magnitude among three-phases voltages of the 3-phase reference voltage;
　a minimum-value determination unit for determining a minimum-value of a magnitude among three-phases voltages of the 3-phase reference voltage;
　an offset determination unit for determining offsets using the maximum-value, the middle-value, and the minimum-value, and a direct-current stage voltage of the inverter; and
　a second adder for adding the offsets to three-phases voltages of the 3-phase reference voltage respectively.

7. The inverter control device of claim 6, wherein the over-modulation unit further includes a limiting unit for limiting an output of the second adder to a predetermined range.

* * * * *